Oct. 14, 1941. W. A. RAY 2,258,811
ELECTROMAGNETICALLY CONTROLLED OPERATOR
Filed May 27, 1940 3 Sheets-Sheet 1
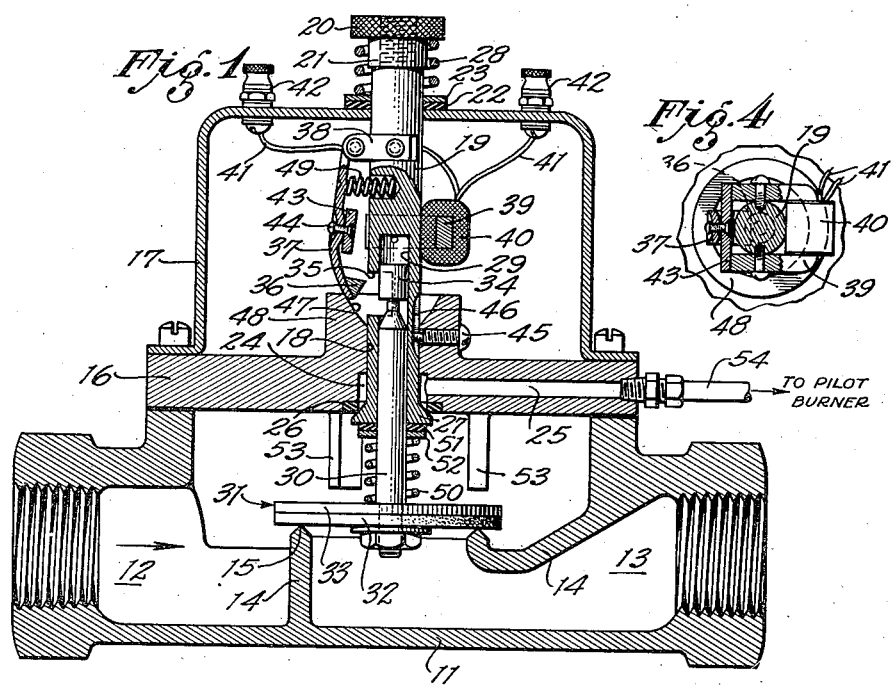
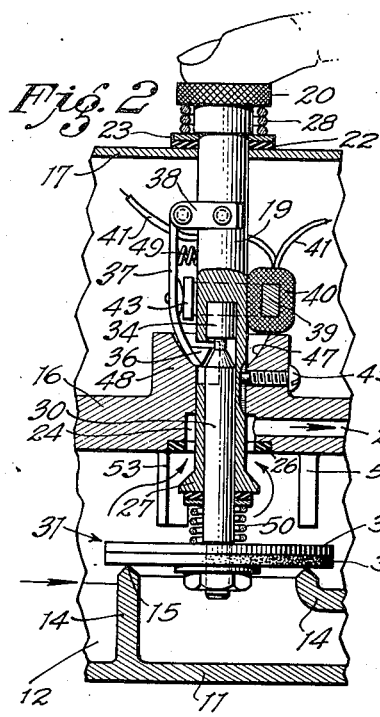
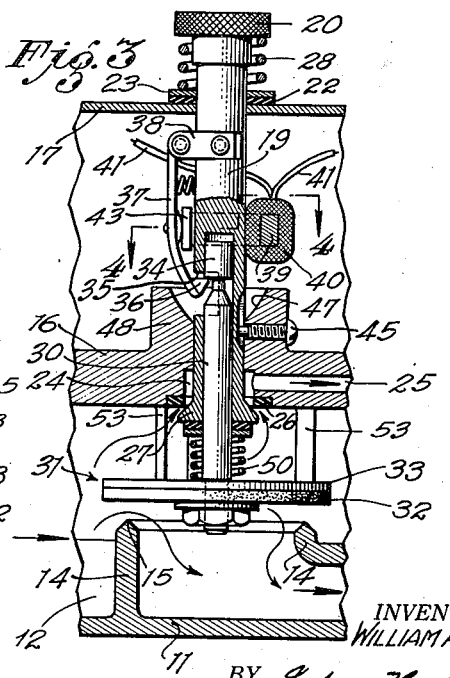
INVENTOR,
WILLIAM A. RAY.
BY John H. Rouse,
ATTORNEY

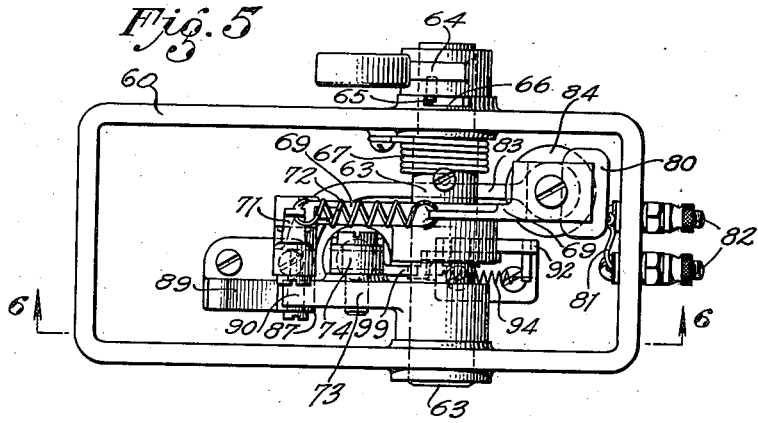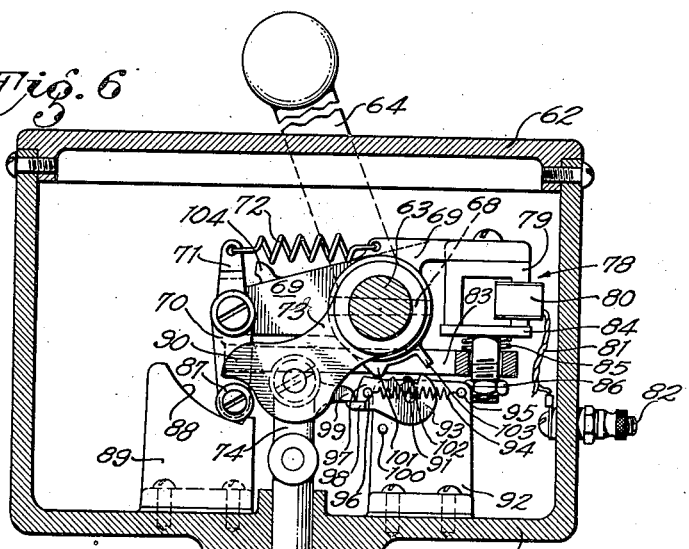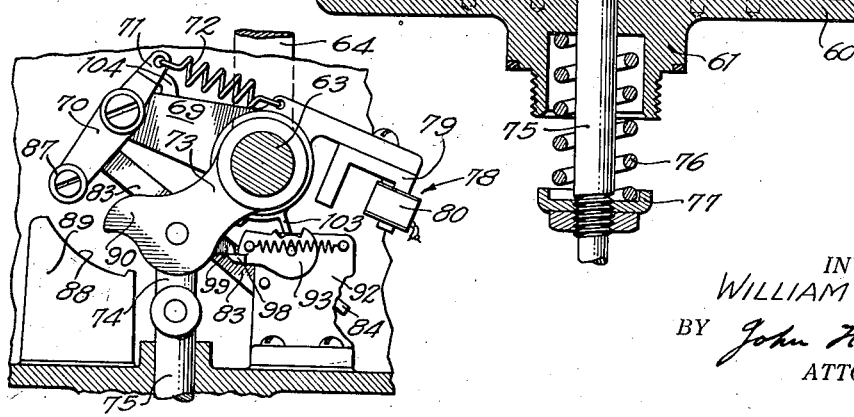

Oct. 14, 1941.  W. A. RAY  2,258,811
ELECTROMAGNETICALLY CONTROLLED OPERATOR
Filed May 27, 1940   3 Sheets-Sheet 3
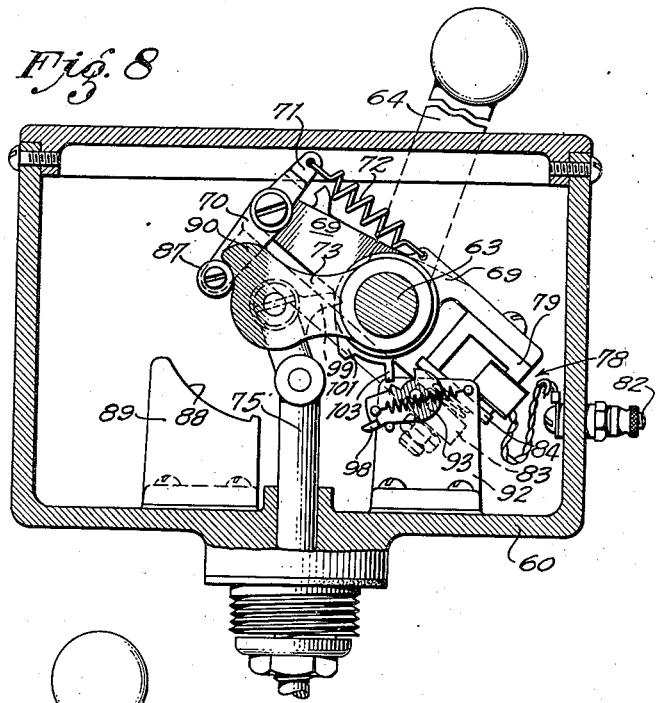
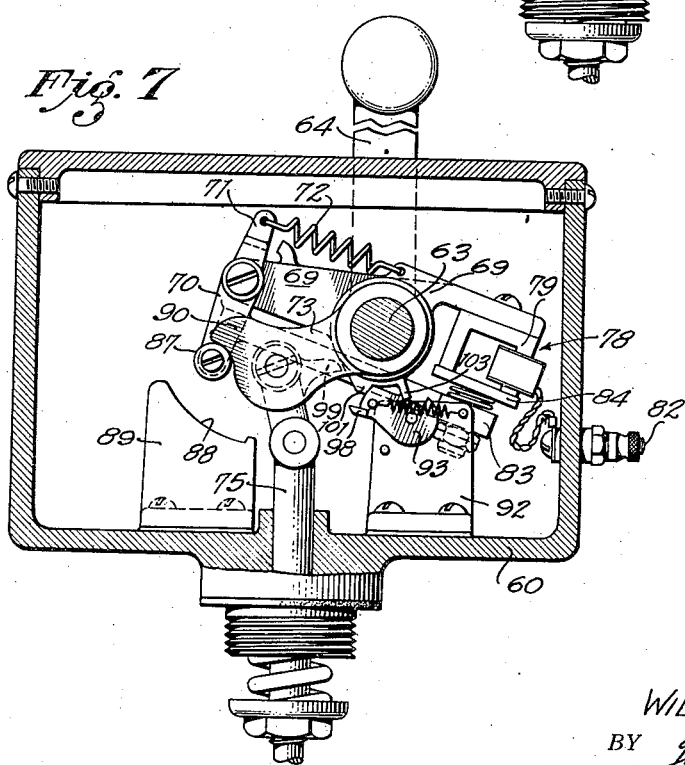
INVENTOR,
WILLIAM A. RAY.
BY John H. Rouse,
ATTORNEY Patented Oct. 14, 1941

2,258,811

UNITED STATES PATENT OFFICE 2,258,811

ELECTROMAGNETICALLY CONTROLLED OPERATOR

William A. Ray, Glendale, Calif.

Application May 27, 1940, Serial No. 337,480

4 Claims. (Cl. 74—469)

My present invention relates to operators for fluid control valves, switches, and other devices which it is desirable to operate only upon the existence of a predetermined "safe" condition, such as, for example, the existence of flame at a pilot burner, or the existence of less than maximum pressure in a boiler.

It is an object of my invention to provide an operator of the character indicated wherein electromagnetic means, controllable by means responsive to a predetermined condition, are provided for so controlling the operator that it is ineffective to perform its function in the absence of the predetermined condition.

Another object is the provision of an operator of the character indicated which includes a latch which is mechanically movable to operating position and is then held in operating condition by electromagnetic means.

Another object is the provision, in an operator of the character indicated, of a latch which is mechanically movable to a position wherefrom, when it is retracted, it can engage and operate a control device only when the latch is electromagnetically conditioned; the control device, after it has been operated, being released by the latch upon deenergization of the electromagnetic means.

In the prior art, devices are found whereby a control device, such as a valve closure member, is held in open position by an electromagnet, against the force of a bias tending to close it, after the closure member has first been brought to that position by mechanical means. As, in some instances, it is desirable to energize the electromagnet by a relatively small amount of power, such as that generated by a pilot-burner-heated thermoelectric device, the use of such prior art devices is then limited to relatively small valves. It is therefore an object of my invention to provide means whereby relatively heavy loads can be operated with minimum consumption of electromagnetic controlling energy.

Other objects and advantages of my invention will be found in the description, the drawings, and the appended claims.

For complete understanding of the invention, reference may be had to the following detailed description and accompanying drawings, wherein:

Figure 1 is a sectional view of a fluid control valve embodying my invention;

Figures 2 and 3 are similar fragmentary views of the valve shown in Fig. 1, showing the parts in the positions which they assume in normal operation;

Figure 4 is a sectional detail view taken along the irregular line 4—4 of Fig. 3;

Figure 5 is a plan view, with cover removed, of a modified form of operator embodying my invention;

Figures 6, 7 and 8 are sectional views of the operator shown in Fig. 5 taken along the line 6—6 of that figure, the parts being shown in the several views in the positions which they assume in normal operation; and Figure 9 is a fragmentary sectional view of the operator shown in Figs. 5–8, showing the parts in the positions which they assume when operation of the device is attempted while the electromagnet is unenergized.

Referring first to Figs. 1–4 of the drawings, the numeral 11 indicates a valve casing having an inlet 12 and an outlet 13 separated by a ported partition 14 which provides an annular main valve seat 15. Secured to the open upper end of the casing 11, with a plate 16 therebetween, is a housing 17. Slidable in an opening 18 formed in the thickened central portion of the plate 16 is a rod 19, the upper end portion of which extends through an opening in the top wall of the housing 17. Threaded on the outer end of the rod is an operating button 20, the reduced lower portion 21 of which limits the downward movement of the rod by engagement with sealing washers 22 and 23 surrounding the opening in the housing. The bore 18 of plate 16 is enlarged at its lower end to form a supplemental port 24 with which a passageway 25, leading to the exterior of the valve, communicates. A valve seat for the supplemental port is provided by a ring 26, of resilient material, secured in a recess formed in the bottom surface of the plate 16. Cooperable with the seat 26 is a valve member 27, formed by the enlarged tapered bottom portion of rod 19, which is normally held in engagement with the seat by a spring 28 compressed between the button 21 and the housing.

Slidable in a concentric lower bore 29 of rod 19 is a main valve stem 30 which carries on its reduced lower end a main valve member 31, cooperable with the seat 15, and comprising a disk 32 of resilient material such as artificial rubber backed by a metal disk 33. A spring 50, compressed between the valve member and the bottom end of rod 19, urges the valve member to closed position; sealing washers 51 and 52 being interposed between the spring and the rod to prevent leakage of fluid around the stem. Upward movement of the valve member is limited by three spaced legs 53, extending from the underside of plate 16. The stem 30 is annularly grooved near its upper end to form a head 34, to permit access to which the wall of the rod 19 is cut away at 35. Arranged to extend through the opening thus formed and to engage the underside of the head 34 of the valve stem, is the nose 36 of a latch member 37 which is pivotally mounted in a bracket 38 secured to a recessed upper portion of the rod 19.

Mounted on the rod 19 is an electromagnet comprising a U-shaped core 39 (Fig. 4) and an energizing coil 40, the leads 41 of which are connected to terminals 42, insulatingly mounted in the top wall of the housing. Rotation of rod 19 is prevented by a screw 45, the reduced inner end portion of which extends into a slot 46 milled in the rod. Cooperable with the pole faces of the core 39 is a rectangular armature 43, carried on a curved portion raised on the inner side of the latch 37, and rockably connected to the latch by a square-shanked rivet 44. By this arrangement, when the latch is so moved as to bring the armature into engagement with the core, accurate alignment of their engaging surfaces is permitted, which is essential when the electromagnet is to be operated by a small amount of power—such as that generated by a pilot-burner-heated thermoelectric device. The electromagnet is not adapted to attract the armature through space, but merely to hold it in engagement with the core, against a bias, when it is brought to that position by mechanical movement of the latch. The lower end of the latch is normally held in engagement with the surface of a concavity 47, formed in an upper boss portion 48 of the plate 16 surrounding bore 18, by a spring 49, mounted in a hole bored in the side of rod 19 and compressed against the latch.

The operation of the valve shown in Figs. 1–4 will now be described. It is to be assumed that the valve inlet 12 is connected to a supply of gas; that its main outlet 13 is connected to a main burner; that the supplemental passageway 25 is connected by a pipe 54 to a pilot burner for the main burner; and that means responsive to the flame of the pilot burner (such as a thermocouple or a thermal cut-out controlling any suitable source of current) is provided for passing current to the electromagnet only while the pilot burner is burning. With the valve parts in the positions shown in Fig. 1, fuel flow to both the main and the pilot burner is obstructed by the valve members 31 and 27 which are in their closed positions.

To initiate operation of the burner system, the rod 19 is moved downward, by manual pressure on button 20, to the position shown in Fig. 2 wherein valve member 27 is out of engagement with seat 26 and fuel can therefore flow from the inlet 12, through port 24, passageway 25, and pipe 54, to the pilot burner where it is lighted. In the downward movement of rod 19, the latch, by the engagement of its lower end with the surface of the concavity 47, was moved inward so that the armature was brought into engagement with the core; the parts being so arranged that the latch is slightly flexed in its final position. If button 20 is released before the pilot burner responsive means is effective to pass sufficient current to the electromagnet to cause it to magnetically hold the armature against the force of spring 49 acting through the latch, the parts will reassume the positions shown in Fig. 1. This, obviously, would also be the case if an attempt were made to "reset" the valve without lighting the pilot burner.

However, if the button is held in depressed position long enough to permit sufficient energization of the electromagnet before the button is released, as the rod 19 is retracted by the force of spring 28, the nose 36 of the latch will engage the underside of head 34 of the valve stem and lift it against the force of the valve member spring 50, the parts assuming the positions shown in Fig. 3 wherein the main valve port is open to supply fuel to the main burner. As the upward movement of rod 19 is now limited by the engagement of valve member 31 with the legs 53, fuel can still flow in sufficient amount to the pilot burner through the partly open supplemental port 24. The force of spring 28 must obviously be great enough to overcome that of spring 50, which need only be sufficient to firmly seat the main valve member.

The valve will now remain in the fully open condition shown in Fig. 3. Should the pilot burner flame be extinguished, upon the resultant cessation of current flow to the electromagnet, the armature will be released and the spring 49 will force the latch outward, disengaging the valve stem 30. The main and the supplemental valve members will then close under the influence of their respective springs and the parts will again assume their normal positions, as shown in Fig. 1; it being impossible to reopen the main valve until the pilot burner is relighted. If automatic control of the main burner is desired, an automatically operable valve may be interposed between the outlet 13 and the main burner, the safety control features of the present invention being retained. Obviously, devices other than valves, such as, for example, switches, may be controlled by the operator described hereinabove. Moreover, the energization of the electromagnet may be controlled by means responsive to conditions other than heat, such as, for example, predetermined pressure.

Referring now to Figs. 5–9 of the drawings, wherein a modified form of electromagnetically controlled operator is disclosed, the numeral 60 indicates a casing having on its underside a threaded boss 61 for the attachment of the casing to a device to be operated, such as, for example, a fluid control valve. A cover for the casing is indicated at 62. Journalled in thickened portions of the front and back walls of the casing is a shaft 63, to the outer end of which is secured, as by a pin (not shown), an operating lever or handle 64. A pin 65, secured in the hub portion of the lever and extending within a recess 66 formed in the adjacent back wall of the casing, by its engagement with either end of the recess, limits rotary movement of the shaft. The shaft is biased in an anticlockwise direction, to the normal position shown in Figs. 5 and 6, by a torsion spring 67, secured to the shaft and to the casing wall. This spring also serves to limit longitudinal movement of the shaft in a rearward direction.

Also secured to the shaft 63, by a pin 68, is an operating arm 69, on the left-hand end of which a latch member 70 is pivotally mounted. The latch member has an upper rearwardly-bent portion 71 which is connected to a central upper portion of the arm 69 by a contractile spring 72. Loosely mounted for rotary movement on the shaft 63 is a member 73, to the arm of which is connected, by a pivoted link 74, a rod 75, the lower end portion of which extends through an opening formed in the bottom wall of the casing and boss 61. This rod is adapted to be connected to a device to be operated, such as, for example, a closure member for a fluid control valve, and is downwardly biased by a spring 76 compressed between the casing and a cup washer 77 carried by the rod. It is to be assumed that the operated device limits the downward movement of the rod to the position shown in Fig. 6.

Carried by the right-hand end portion of arm 69 is an electromagnet, generally indicated at 78 and comprising a U-shaped core 79 and an energizing coil 80, the flexible leads 81 of which are connected to terminals 82 insulatingly mounted in an end wall of the casing. Projecting rearwardly and to the right from a lower portion of the latch member 70, and formed integral therewith, is an arm 83 which carries on its free end an armature 84, cooperable with the electromagnet 78. The armature is flexibly mounted by its stem which extends loosely through an opening in arm 83. A spring 85 urges the armature upward, movement in that direction being limited by nuts 86 threaded on the stem. By this arrangement, the surface of the armature can readily conform to that of the pole faces of the core, the nuts 86 being so adjusted that there is a small clearance between them and the arm when the parts are in their normal positions, as shown in Fig. 6. The function of the electromagnet 78 is the same as that of the electromagnet employed in the device shown in Figs. 1–4, viz., to magnetically hold the armature when it is mechanically brought into engagement with the core. Attraction of the armature through space is not contemplated.

Pivotally mounted on the front side of the lower end of the latch 70 is a roller 87 which normally rests on the inclined upper surface 88 of a bracket 89, secured to the bottom wall of the casing. This roller is so positioned as to engage the projecting left-hand portion or nose 90 of the member 73 when the latch is lifted under conditions hereinafter to be described.

Pivotally mounted by a pin 91 on another bracket 92 secured to the casing, is a pawl 93. A contractile spring 94, secured at one end to a pin 95 fixed in the bracket and at its other end to a pin 96 fixed in the pawl, is adapted to urge the left-hand end portion or nose 97 of the pawl either upward or downward, from a central position wherein pins 96, 91 and 95 are in alignment, depending on the direction in which the pawl is moved past that position. In its normal position as shown in Fig. 6, the pawl is biased upwardly and is limited in that direction by the engagement of a lug 98, projecting from its left-hand front surface, with a portion 99 projecting from the side of link 74. A pin 100, fixed in the bracket, limits downward movement of the pawl. Cooperable with the nose 97 of the pawl is a cam 101 formed on the hub portion of the arm 69; and cooperable with either end of a notch 102 cut in the central upper portion of the pawl is a finger 103, also formed on the hub of arm 69.

The operation of the device shown in Figs. 5–9 is as follows: In Fig. 6, the parts are shown in their normal, or unoperated positions, with the rod 75 depressed. Under proper conditions, the rod may be raised by moving the operating lever or handle 64 to the right. However, if the handle is moved while the electromagnet is unenergized, upon the initial resulting upward movement of the arm 69, the latch member 70, urged by spring 72, will be permitted to rotate in a clockwise direction, its roller 87 following the inclined surface 88, and the armature on the end of latch arm 83 falling away from the electromagnet. In this movement, the roller passes under the nose 90 of the member 73 and the parts assume the positions shown in Fig. 9, the upper end portion 71 of the latch being in engagement with a stop member 104 extending from the upper left-hand edge of arm 69. If the handle is moved still farther to the right, the finger 103 will engage the left-hand end of the notch 102 in the pawl and move the pawl past its central position so that its nose is then moved downward into engagement with pin 100 by the force of spring 94. Movement of the handle to the right is limited by engagement of pin 65 with the end of recess 66. If the handle is now released, the parts will be returned to the positions shown in Fig. 6 by the force of spring 67. In passing to this position, the pawl will be tripped back into contact with the link projection 99 by the engagement of finger 103 with the right-hand end of notch 102; the latch, by its engagement with the surface 88, being rotated in an anticlockwise direction.

If, on the other hand, the electromagnet is in energized condition while the handle is operated, upon initial upward movement of the arm 69, the latch roller will engage the nose 90 of the member 73, inasmuch as the latch arm 83 is now held by the electromagnet. Thus, upon further movement of the handle, the member 73, link 74 and rod 75 are raised. The pawl, now being released from its engagement with the link projection 99, will be forced by spring 94 against cam 101 which will ride thereon until the handle reaches its vertical position, whereupon the pawl will rise into the space between the cam and the finger 103. The handle may then be released, the parts being retained in the positions shown in Fig. 7 by the engagement of the nose of the pawl with the right-hand side of the cam.

If it is desired to lower the rod 75, the handle is moved still farther to the right into the position shown in Fig. 8. In this movement, as was described above, the finger 103 will engage the left-hand end of the notch 102 in the pawl and move the pawl (which is now out of engagement with the cam 101) past its central position so that its nose is then moved downward into engagement with pin 100 by the force of spring 94. If the handle is now released, it will be moved to its left-hand position by the spring 67, the parts reassuming their normal positions as shown in Fig. 6. In this movement, when the handle is slightly past its vertical position, the finger 103 will engage the right-hand end of the pawl notch and trip the pawl upward. But, when this occurs, the cam 101 will have moved past the end of the pawl nose and thus will again ride on its upper edge until the pawl is finally engaged by the link projection 99. In this return movement of the parts, the armature being held by the electromagnet, the latch roller will engage the surface 88 only when it is in its final position.

If, while the device is held in its operated position by the cam and pawl as shown in Fig. 7, the electromagnet is deenergized, the latch arm 83 will be released and the latch will be rotated in a clockwise direction by its spring 72, releasing the nose 90 of the member 73 and thus permitting the rod 75 to be moved downward by its spring 76. In this movement, the link projection 99 will engage the lug 98 and move the pawl downward, releasing the cam 101 and thus permitting the handle to return to its normal position; the latch, by the engagement of its roller with the surface 88, being rotated in an anticlockwise direction, bringing the armature back into engagement with the core. It will be noted that the position of the handle (when it is not manually held) always indicates the condition of the rod 75.

While I have herein shown and described specific embodiments of my invention, I wish it to be understood that modifications may be made without departing from the spirit of my invention, and that I intend therefore to be limited only by the scope of the appended claims.

I claim as my invention:

1. In a mechanically operable and electromagnetically controlled operator, in combination: a first member adapted to be moved mechanically; a latch carried by said first member; electromagnetic means comprising a core element, having an energizing coil, and an armature element cooperable with said core; one of said electromagnetic elements being mounted on said first member and the other on said latch; said latch being movable with respect to said first member between a first position wherein said electromagnetic elements are in engagement with each other, and a second position, wherein said elements are out of engagement; means biasing said latch to said second position; said core being adapted when energized to magnetically hold said armature in engagement therewith only when the electromagnetic elements are first mechanically brought to that position, whereby said latch is maintained in said first position against the force of said bias; a second member adapted to be operated by the movement of said first member only when said latch is magnetically held in said first position; and means, so positioned as to be engaged by said latch when said first member is initially moved, for moving said latch to said first position.

2. In a mechanically operable and electromagnetically controlled operator, in combination: a first member adapted to be moved mechanically; a latch pivotally connected to said first member and movable therewith; electromagnetic means comprising a core element, having an energizing coil, and an armature element cooperable with said core; one of said electromagnetic elements being mounted on said first member and the other on a portion of said latch; said latch being movable with respect to said first member between a first position, wherein said electromagnetic elements are in engagement with each other, and a second position, wherein said elements are out of engagement; means biasing said latch to said second position; said core being adapted when energized to magnetically hold said armature in engagement therewith only when the electromagnetic elements are first mechanically brought to that position, whereby said latch is maintained in said first position against the force of said bias; means, positioned in the patch in which said latch is moved by the movement of said first member in one direction, for deflecting said latch into said first position; and a second member adapted to be engaged by said latch, only when the same is magnetically held in said first position, and to be operated thereby in the subsequent movement in another direction of said first member.

3. In a manually operable and electromagnetically controlled operator, in combination: a first member mounted for reciprocable movement; a latch pivotally mounted on said first member and movable therewith; an electromagnet carried by said first member, and an armature carried by said latch and cooperable with said electromagnet; said latch being movable between a first and a second position wherein said armature is respectively in engagement and out of engagement with said electromagnet; means biasing said latch to said second position; said electromagnet when energized being adapted to magnetically hold said armature, only when it is first mechanically brought into engagement therewith, whereby said latch is maintained in said first position against the force of said bias; a second movable member; and means, fixed with respect to said latch and said first member and engageable by said latch when the same is moved by the movement in one direction of said first member, for deflecting said latch into said first position wherein said second member is engaged and moved by said latch when said first member is subsequently moved in an opposite direction, only when said electromagnet is energized.

4. In a manually operable and electromagnetically controlled operator, in combination: a first member pivotally mounted for manual operation; a latch pivotally mounted on said first member and movable therewith; electromagnetic means comprising a core element, having an energizing coil, and an armature element adapted to be magnetically held by said core element when the same is energized, only when said elements are first mechanically brought into engagement with each other; one of said elements being mounted on said first member and the other on a portion of said latch; relatively fixed means, positioned in the path in which said latch is moved by the movement in one direction of said first member, for deflecting said latch to a first position with respect to said first member wherein said electromagnetic elements are in engagement with each other; means biasing said latch to a second position with respect to said first member wherein said electromagnetic elements are out of engagement; a second member having a portion, disposed adjacent said latch when the same is deflected into said first position by said movement in one direction of said first member, and adapted to be engaged and moved by said latch when the same is moved by subsequent movement of said first member in an opposite direction, only when said core element is energized; means biasing said second member to unmoved position; and means for retaining said second member in its moved position against the force of its bias only while said core element is energized.

WILLIAM A. RAY.